(12) United States Patent
Jin et al.

(10) Patent No.: US 9,245,554 B2
(45) Date of Patent: Jan. 26, 2016

(54) TILTED STRUCTURES TO REDUCE REFLECTION IN LASER-ASSISTED TAMR

(71) Applicant: Headway Technologies, Inc., Milpitas, CA (US)

(72) Inventors: Xuhui Jin, San Jose, CA (US); Xiaohua Lou, San Jose, CA (US); Joe Smyth, Aptos, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/580,344

(22) Filed: Dec. 23, 2014

(65) Prior Publication Data

US 2015/0109893 A1 Apr. 23, 2015

Related U.S. Application Data

(62) Division of application No. 13/778,983, filed on Feb. 27, 2013, now Pat. No. 8,923,098.

(51) Int. Cl.
*G11B 5/48* (2006.01)
*G11B 5/31* (2006.01)
*G11B 5/60* (2006.01)
*G11B 5/127* (2006.01)
*G11B 13/04* (2006.01)
*G11B 5/00* (2006.01)

(52) U.S. Cl.
CPC .............. *G11B 5/4866* (2013.01); *G11B 5/127* (2013.01); *G11B 5/314* (2013.01); *G11B 5/6005* (2013.01); *G11B 5/6088* (2013.01); *G11B 13/04* (2013.01); *G11B 2005/0021* (2013.01); *Y10T 29/49032* (2015.01)

(58) Field of Classification Search
None
See application file for complete search history.

(56) References Cited

U.S. PATENT DOCUMENTS

| 8,238,202 | B2 | 8/2012 | Schreck et al. | |
| 8,243,561 | B2 * | 8/2012 | Matsumoto | 369/13.33 |
| 8,274,867 | B2 | 9/2012 | Mori et al. | |
| 2006/0185577 | A1 * | 8/2006 | Watanabe et al. | 117/2 |
| 2010/0238580 | A1 * | 9/2010 | Shimazawa et al. | 360/59 |
| 2011/0164334 | A1 * | 7/2011 | Jin et al. | 360/59 |
| 2011/0170381 | A1 * | 7/2011 | Matsumoto | 369/13.33 |
| 2012/0257490 | A1 | 10/2012 | Zhou | |

* cited by examiner

*Primary Examiner* — Brenda Bernardi
(74) *Attorney, Agent, or Firm* — Saile Ackerman LLC; Stephen B. Ackerman

(57) ABSTRACT

A TAMR (Thermal Assisted Magnetic Recording) write head uses the energy of optical-laser excited surface plasmons in a plasmon generator to locally heat a magnetic recording medium and reduce its coercivity and magnetic anisotropy. The optical radiation is transmitted to the plasmon generator by means of a waveguide, whose optical axis (centerline) is tilted relative to either or both the backside surface normal and ABS surface normal in order to eliminate back reflections of the optical radiation that can adversely affect the properties and performance of the laser. Variations of the disclosure include tilting the plasmon generator, the waveguide and the laser diode.

7 Claims, 6 Drawing Sheets

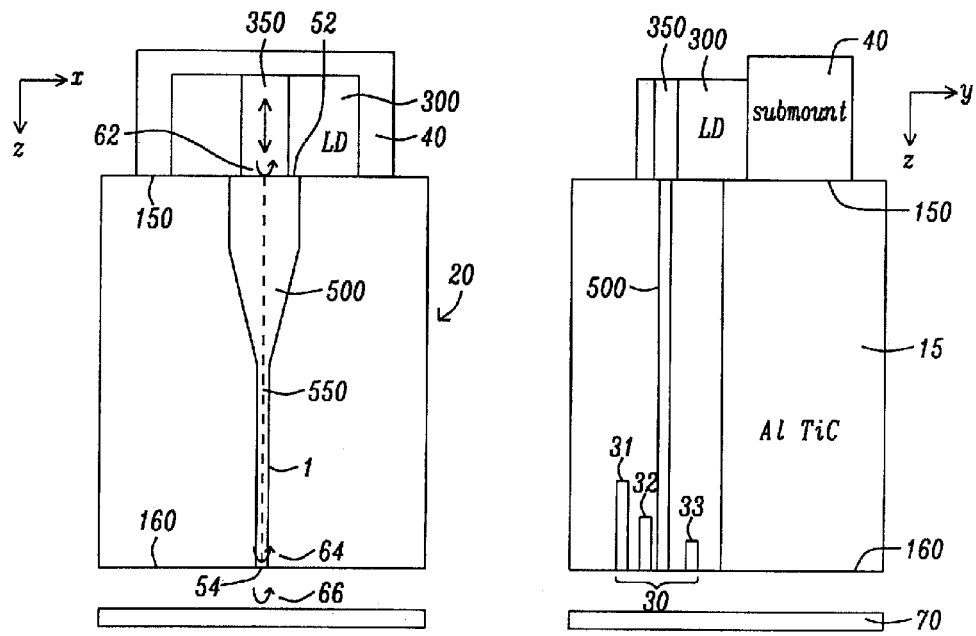
FIG. 1a
Prior Art
FIG. 1b
Prior Art
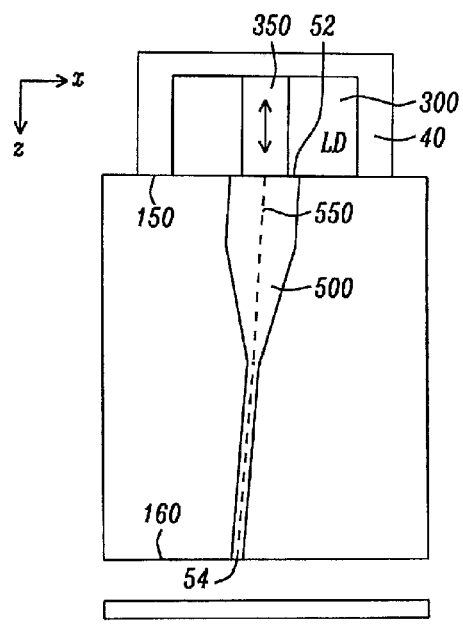
FIG. 2

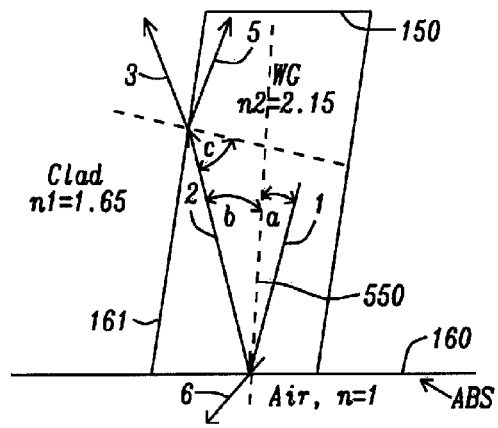
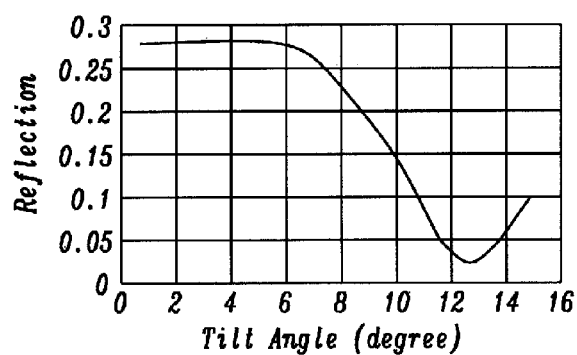
FIG. 3           FIG. 4
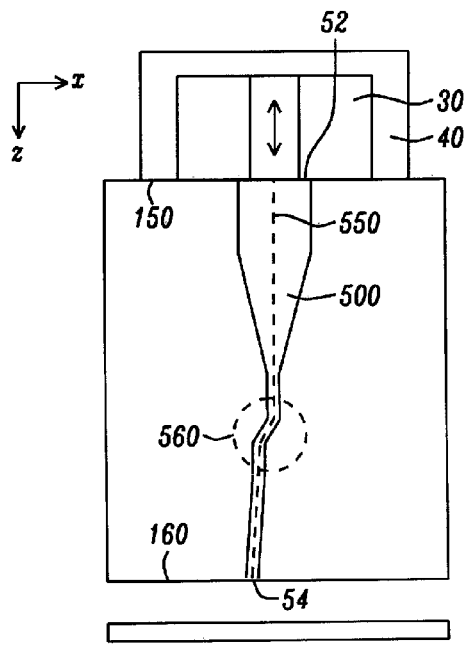
FIG. 5

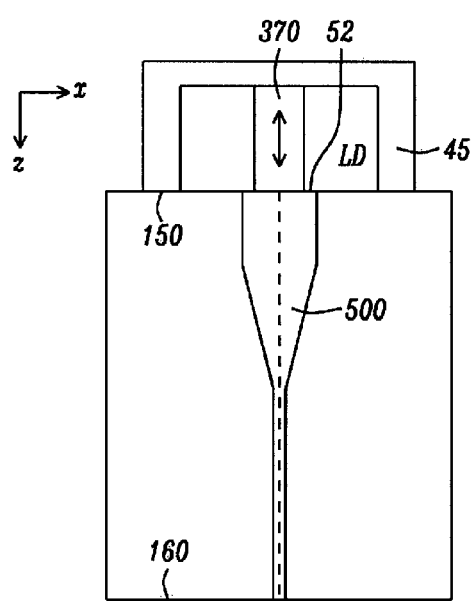
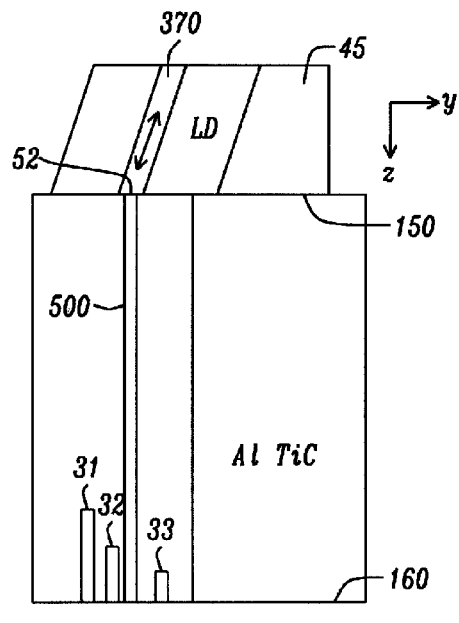
FIG. 11a
FIG. 11b
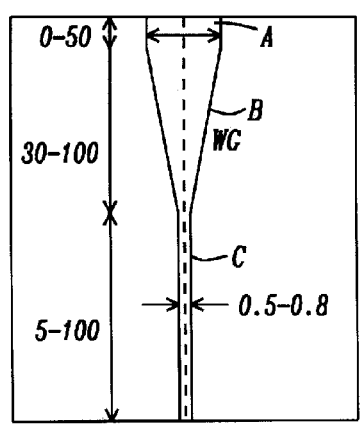
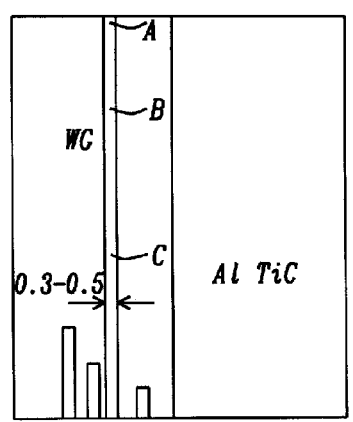
FIG. 12a
FIG. 12b

TILTED STRUCTURES TO REDUCE
TILTED STRUCTURES TO REDUCE REFLECTION IN LASER-ASSISTED TAMR

This is a Divisional Application of U.S. patent application Ser. No. 13/778,983 filed on Feb. 27, 2013, which is herein incorporated by reference in its entirety and assigned to a common assignee.

BACKGROUND

1. Technical Field

This invention relates to magnetic read/write heads that employ TAMR (thermally assisted magnetic recording) using laser energy to heat magnetic media having high coercivity and high magnetic anisotropy. More particularly, it relates to methods that reduce reflections of the laser radiation back to the TAMR structures.

2. Description of the Related Art

Magnetic recording at area data densities of between 1 and 10 Tera-bits per $in^2$ involves the development of new magnetic recording media, new magnetic recording heads and, most importantly, a new magnetic recording scheme that can delay the onset of the so-called "superparamagnetic" effect. This latter effect is the thermal instability of the extremely small regions of magnetic material on which information must be recorded, in order to achieve the required data densities. A way of circumventing this thermal instability is to use magnetic recording media with high magnetic anisotropy and high coercivity that can still be written upon by the increasingly small write heads required for producing the high data density. This way of addressing the problem produces two conflicting requirements:

1. The need for a stronger writing field that is necessitated by the highly anisotropic and coercive magnetic media.
2. The need for a smaller write head of sufficient definition to produce the high areal write densities, which write heads, disadvantageously, produce a smaller field gradient and broader field profile.

Satisfying these requirements simultaneously may be a limiting factor in the further development of the present magnetic recording scheme used in state of the art hard-disk-drives (HDD). If that is the case, further increases in recording area density may not be achievable within those schemes. One way of addressing these conflicting requirements is by the use of assisted recording methodologies, notably thermally assisted magnetic recording, or TAMR.

Prior art forms of assisted recording methodologies being applied to the elimination of the above problem share a common feature: transferring energy into the magnetic recording system through the use of physical methods that are not directly related to the magnetic field produced by the write head. If an assisted recording scheme can produce a medium-property profile to enable low-field writing localized at the write field area, then even a weak write field can produce high data density recording because of the multiplicative effect of the spatial gradients of both the medium property profile and the write field. These prior art assisted recording schemes either involve deep sub-micron localized heating by an optical beam or ultra-high frequency AC magnetic field generation.

The heating effect of TAMR works by raising the temperature of a small region of the magnetic medium to essentially its Curie temperature ($T_c$), at which temperature both its coercivity and anisotropy are significantly reduced and magnetic writing becomes easier to produce within that region.

In the following, we will address our attention to a particular implementation of TAMR, namely by the transfer of electromagnetic energy from an optical frequency laser diode (LD), through an optical waveguide (WG) to a small, sub-micron sized region of a magnetic medium, either directly, or, more typically through interaction of the magnetic medium with the near field of a surface plasmon in a plasmon generator (PG) excited by the laser radiation. The transferred electromagnetic energy then causes the temperature of the medium to increase locally to enable the write operation. However, in what follows, we will not eliminate the possibility that the electromagnetic radiation may be radiation that is other than optical frequency, in which case the conditions for suppression of reflections will have to be calculated using suitable boundary conditions at the interfaces.

As illustrated in schematic and prior art FIGS. 1(a) and 1(b), there is shown a front (x-z plane) view (1(a)) and a side (y-z plane) cross-sectional view (1(b)) displaying only the optical architecture of a TAMR device. It is understood that a magnetic write pole is located adjacent to this optical architecture (see (31) in FIG. 1(b)) so that a magnetic write field can be applied to the thermally heated spot on the recording medium.

Referring to the Cartesian coordinates in FIG. 1(a), the ABS plane (160) of the slider (20) is the x-y plane. The slider contains the read/write transducer elements ((30) in FIG. 1(b)) and its ABS surface is aerodynamically structured to fly over a rotating magnetic recording medium.

Returning to FIG. 1(a), there is shown the laser diode (300) affixed to a submount (40), with the combination being mounted on the back side surface (90) of the slider. The active portion of the laser diode is a Fabry-Perot-type resonant cavity (350). The bottom surface of the laser diode cavity, denoted its exit facet, couples to the top surface (52) of a waveguide (500). The waveguide passes through the slider, from the back end surface (150) of the slider, to its ABS (160) end, where the waveguide terminates. We note that a portion of the ABS end of the waveguide will generally also interface with and couple to an adjacent plasmon generator (see (32) in FIG. 1(b)) which absorbs electromagnetic energy from the waveguide mode and generates surface plasmons. The near-field of these plasmons can focus energy within a spot size on the recording medium that is not diffraction limited, as the laser radiation alone would be. Further details of the plasmon generator structure, other than its orientation relative to the waveguide, are not discussed in this disclosure but for the purposes of the description of this and subsequent figures, the plasmon generator may be considered as being in front of and immediately adjacent to the the ABS end of the waveguide, as will be indicated by (32) in FIG. 1 (b).

Referring to FIG. 1(b), there is shown a side cross-sectional view of the slider in FIG. 1(a), which is formed on a substrate (15) of AlTiC. There is also shown the side view of the laser diode (300), and the waveguide (500), which terminates in the ABS within the read/write transducer region (30). Within (30), there is also shown the relative positions of the writer (31), the reader (33) and the plasmon generator (32), the generator being situated between the writer (31) and the waveguide (500) and is adjacent to the ABS end of the waveguide (500). A portion of the rotating magnetic recording medium (70) is shown beneath the ABS. It is noted that the writer (31) essentially comprises an inductively driven magnetic write pole and it will be indicated simply as such a pole in FIG. 6, below.

The waveguide structure (500) illustrated in FIGS. 1(a) and 1(b) forms an external resonance cavity which is in addition to the laser diode's own resonance cavity (350) that supports the laser optical mode. In the illustrated configuration, the centerline (550) of the WG structure is normal to both its end surfaces: the backside end (52) which is coupled to the laser and the ABS end (54) that terminates at the ABS of the slider. Note that the centerline (550) is equally normal to both end surfaces of the slider.

Analysis of the TAMR action indicates that optical radiation from the laser is reflected at three interfacial surfaces:

(#1): the interface between the laser exit facet and waveguide at the back surface of the slider (the reflected radiation being shown as a U-shaped curved arrow (62));

(#2): the terminal surface of the WG (the reflected radiation shown as a U-shaped arrow (64)) at the ABS end of the slider (which can also include a plasmon generator) and;

(#3): at the surface of the recording medium (the reflected radiation shown as a U-shaped arrow (66)).

Following the propagation path, the laser light first passes the interface (#1) above, which is the interface between the emitting facet of the laser diode and the inlet end of the waveguide. At this interface, some laser light will be reflected back into the laser cavity due to the change in the refractive index. Laser light now couples with the waveguide mode and propagates towards the ABS end of the slider, whereupon it passes through the interface (#2) above, which is the ABS surface of the slider. Some light will also reflect back at this interface. In addition, light passing through the slider ABS across the gap between the slider ABS and the surface of the recording medium will also reflect back from the medium surface at interface (#3).

Each of these reflected radiation components can get back into the laser cavity and cause laser mode hopping, which are changes in the laser wavelengths and corresponding changes in the laser power transferred to these wavelengths. These unwanted variations cause changes in the temperature of the recording medium, introduce jitter into the recording bits and cause track-width changes to the recording process. In addition, the power ratio between the emitting side and the back side of the LD varies due to the reflected radiation which makes it very difficult, if not impossible monitor light intensity from the back side by means of an integrated photo-diode (PD) in order to achieve a feedback-controlled constant power output at the ABS end. Recent experiments in furtherance of this disclosure have confirmed the existence of back reflections for the TAMR optical architecture of FIGS. 1(a) and 1(b) by measuring the quantum shifts of the lasing wavelengths when increasing the current to the LD.

Although the following prior arts have discussed these issues: U.S. Pat. No. 8,274,867 (Mori et al.); U.S. Pat. No. 8,238,202 (Schreck et al.) and U.S. Patent Application 2012/0257490 (Zhou), neither the methods disclosed nor their results are the same as those to be described herein.

SUMMARY

It is an object of this disclosure to provide an optical-laser-driven TAMR device in which the effects of back reflected laser light are eliminated.

It is a further object of this disclosure to provide stable laser power to a TAMR slider as a result of eliminating back reflected light.

It is still a further object of this disclosure to reduce variations in media temperature that arise as a result of the adverse effects of back reflected light in a TAMR slider.

It is yet a further object of this disclosure to achieve the previous objects while also reducing recording transition shifts due to thermal spot variations and to ultimately improve the linear density capability of the recording process while also reducing adjacent track interference resulting from laser power fluctuations.

It is yet a further object of this disclosure to achieve the preceding objects with minimal changes in present fabrication methods, specifically by requiring only mask changes for waveguide and plasmon generator patterning and by requiring only small angle variations that will still be consistent with lapping sensitivities.

These objects will be met by means of a tilted [laser/waveguide/plasmon generator] structure (separately tilted or in various combinations), to be shown and described in detail in FIGS. 2-10, below. In this tilted structure, the centerline along the optical axis (direction of radiation propagation) of the waveguide is not perpendicular to either one or both end surfaces of the slider (i.e., the backside surface or the ABS surface). Additionally, the plasmon generator may or may not be tilted. Further, a laser diode (LD) is formed in which the axis of the diode cavity (350), which is typically a Fabry-Perot type cavity resonator, may also be tilted relative to its mounting surface on the backside of the waveguide, providing yet a further mechanism by which reflected light produced by the laser is prevented from reflecting back into the laser cavity. In this way, the reflected light from these surfaces can be completely suppressed.

Ideally, in theory, the tilted angle for the back end surface side of the slider, which is its interface with the LD, is chosen so that the light reflected to the LD (see reflection arrow (62) in FIG. 1(a)), will be unable to satisfy the condition for total internal reflection (TIR) for the waveguide structure of the LD cavity, which is a Fabry-Perot type cavity formed by properly cleaved crystal planes of the LD wafer. This waveguide structure is normally a ridge structure for obtaining edge-emission type laser optical radiation, so when the reflected optical radiation from the back surface of the slider passes through the front facet of the LD it cannot propagate through the LD cavity to interfere with the laser light that is established in the cavity resonator.

In theory, the tilted angle between the ABS surface side of the slider, which is its interface with the medium, can be chosen so that the reflected light from the ABS surface (see reflection arrow (64) in FIG. 1(a)) as well as reflected light from the medium itself (see reflection arrow (66) in FIG. 1(a)) will be unable to satisfy the condition for total internal reflection (TIR) within the WG in the slider ((50) in FIG. 1(a)). If this is so, the reflected light from these two surfaces will be unable to propagate backwards through the WG channel to reach the LD cavity and have an adverse impact. Furthermore, because of the 3-dimensional WG structure and the effective mode index for the actual WG mode, even a smaller tilt angle is required than the theoretical critical angle in order to reduce the effects of the reflected light.

In addition, the plasmon generator structure can also be tilted to eliminate the back reflected light during the light coupling process from the waveguide to the plasmon generator. This reflection occurs as a result of the change in the effective mode index along the light propagation direction when the plasmon generator is placed near the WG and the PG shape changes along the WG.

BRIEF DESCRIPTION OF THE DRAWINGS

The objects, features, and advantages of the present invention are understood within the context of the Description of the Preferred Embodiments as set forth below. The Description of the Preferred Embodiments is understood within the context of the accompanying figures, wherein:

FIGS. 1(a) and 1(b) are front 1(a) and side 1(b) schematic views of a prior art TAMR slider and its optical apparatus for transferring optical radiation to a recording medium in which the apparatus is not tilted and radiation is reflected back into the laser cavity.

FIG. 2 is a schematic front view of a TAMR slider having a tilted waveguide whose centerline is not normal to either the backside or ABS surfaces of the slider.

FIG. 3 is a schematic diagram illustrating light reflections at a waveguide-to-air interface and a waveguide-to-clad interface for the purposes of applying Snell's Law.

FIG. 4 is a graphical indication of the relationship between the amount of total reflection and the tilt angle of a waveguide, such as the waveguide of FIG. 2.

FIG. 5 is a schematic illustration of a TAMR slider having a waveguide that includes a smoothly bent region that causes the ABS end of the waveguide centerline to be tilted with respect to the normal to the ABS.

FIGS. 11(a) and (b) are a front and side schematic illustration showing a laser with a cavity that is tilted in the y-z plane and a straight waveguide.

FIGS. 12(a) and (b) are schematic front and side schematic views of a waveguide structure showing its approximate dimensions in microns (μm).

DETAILED DESCRIPTION

Figure 6A:
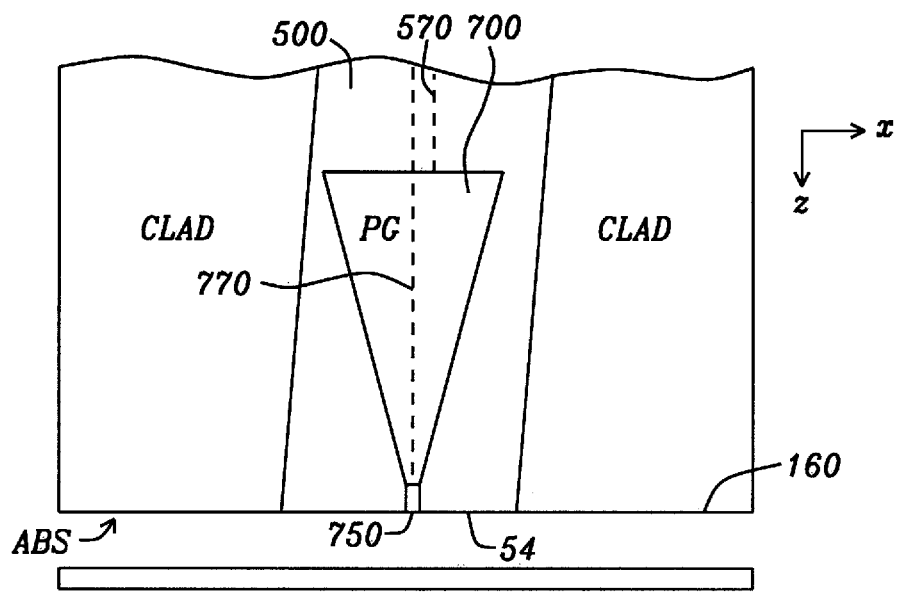
FIGS. 6(a) and 6(b) are schematic illustrations showing a front (a) and side (b) view of a waveguide and adjacent plasmon generator, where the waveguide is tilted, but the plasmon generator is not tilted.

The details of the following disclosure will be understood by first referring to FIG. 2, which shows, schematically, a basic TAMR slider structure similar to that shown in FIG. 1(a), but with the waveguide (500) now inclined relative to the vertical (z-direction) so that the center line (550) through the waveguide, along the light-propagation direction, makes a uniform angle to the normal (which is the z-direction) of both the back end surface (150) of the slider and the ABS surface of the slider. The tilted waveguide has the same y-z cross-section as the waveguide shown in FIG. 1(b), but both the top surface (52), in the back end plane of the slider, and the bottom surface (54), in the ABS plane (160) of the slider, are tilted at the same angle to the normal (the z-axis).

Referring next to FIG. 3, there is shown a diagram schematically illustrating an application of Snell's Law of reflection to the back reflection of the optical laser light at the interface between the waveguide and the ABS of the slider. The application of Snell's Law takes into account the fact that there are three regions of differing indices of refraction. The index of refraction of the air layer, between the ABS of the slider and the surface of the recording medium, is $n_0=1$. The index of refraction of the external cladding of the waveguide (region immediately surrounding the waveguide) is, typically, $n_1=1.65$. The index of refraction of the core material filling the waveguide is $n_2=2.15$. From the figure it can be seen that light ray 1 is reflected back as light ray 2 at the ABS waveguide-to-air interface (160), where angle of reflection b equals angle of incidence a. A light ray, denoted 6, is refracted into the air space. The reflected light ray 2 propagates until it strikes surface (161), which is the waveguide-cladding interface. At this interface, light ray 2 makes an angle c with the normal to the interface. If angle c is less than the critical angle for total internal reflection, there will be some leakage into the cladding region in the form of ray 3 and there will be internally reflected light in the form of ray 5. Reflected ray 5 will strike the upper surface (150) of the waveguide and some light will refract into the cladding above the surface. After multiple refractions, very little reflected light remains within the waveguide before reaching the inlet side of the waveguide where it couples to the laser. Therefore, no reflected light from the ABS interface (160) can reach the laser cavity to affect its performance.

Ideally, the tilt angle, a, between the waveguide centerline (550) and the normal to the back surface side of the slider (150), where the waveguide interfaces with the laser, is chosen so that the reflected light to the laser will be unable to satisfy the total internal reflection condition within the laser and will not propagate backwards into the laser cavity. The laser cavity is typically a ridge structure for edge-emission type of radiation, so that when the light from the back surface of the slider (150) passes through the front facet of the laser diode structure it cannot propagate into the cavity to interfere with the radiation mode that has been established within the cavity resonator.

By Snell's Law, the critical angle for total internal reflection into the waveguide, $\theta_{cr}$, at the waveguide-to-clad interface (161) is given by: $\theta_{cr}=\sin^{-1}(n_1/n_2)=50.1°$. The incident angle, c, of the waveguide-to-clad interface, is $90°-a-b=90°-2a>\theta_{cr}$, so the waveguide tilt angle a should be less than about 19.9°.

However, due to the 3-dimensional waveguide structure and the effective mode index for the actual waveguide mode, the tilt angle can be even less than the value calculated above and the reflected light will already be greatly reduced. Referring to FIG. 4, there is shown a graphical simulation result that plots total reflected light including both inlet (150) and outlet (160) interfaces. At a tilt angle of approximately 13°, the total reflection is only 3%. Considering that some of this reflection is from the inlet side of the waveguide, the amount from the outlet side is virtually completely suppressed.

Referring next to FIG. 5, there is shown an alternate embodiment in which only the outlet side (54) of the waveguide is tilted (i.e., there is an angle between the normal to the ABS, which is the z-axis, and the centerline of the waveguide at the ABS). The inlet side propagation direction is still along the z-axis. In this case, additional anti-reflection coatings (ARC) can be applied to the inlet side of the waveguide to reduce the reflected light that might propagate back into the laser cavity. The thickness of the ARC layer can be chosen to be ¼ of the wavelength of the laser light in the layer so that incident and reflected rays cancel out. In addition, the transition region (560) from the upper portion of the waveguide whose centerline (550) is along the z-axis, to the lower portion whose centerline (560) is tilted relative to the z-axis, can be formed as a smooth curve (shown encircled, as an s-bend) to reduce optical losses.

In addition to the various tilting mechanisms and configurations applied to the waveguide structure itself, the plasmon generator structure, which is formed adjacent to the waveguide, can also be tilted to eliminate back-reflected optical radiation during the radiation coupling process between the waveguide and the plasmon generator. This reflection occurs due to the changing of the effective mode index along the direction of radiation propagation in the waveguide when the plasmon generator is placed adjacent to the waveguide as well as changes in the shape of the plasmon generator along the waveguide. The following figures will illustrate three configurations of waveguides and adjacent plasmon generators where the relative tilt between them eliminates reflected light back to the laser diode.

Figure 6B:
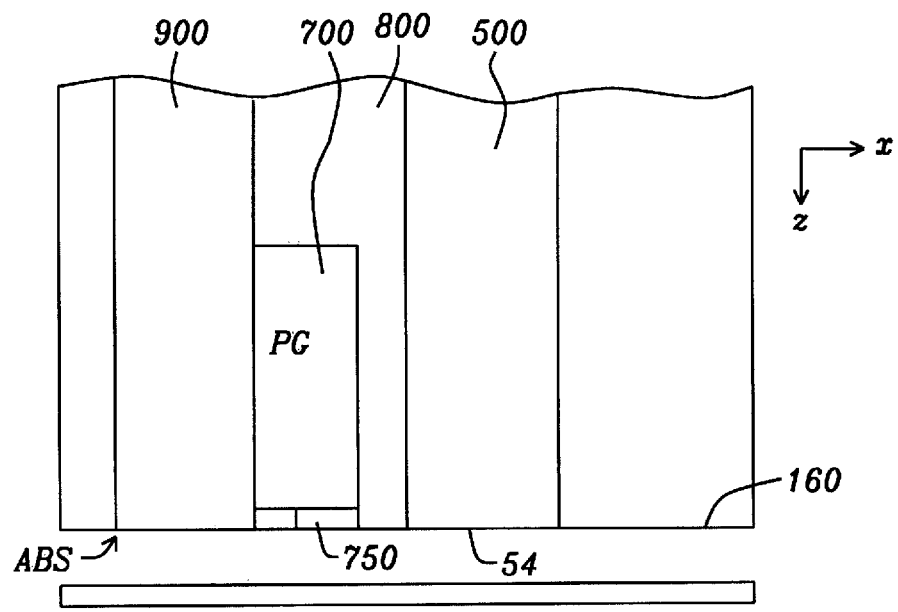

Referring next to FIGS. 6(a) and 6(b), there are shown front 6(a) and side 6(b) cross-sectional views in which an un-tilted plasmon generator (700) is placed adjacent to the ABS end of a tilted waveguide (500) whose lower end centerline (570) is shown making an angle with the z-axis. The plasmon generator (700) is here shown schematically as having a truncated triangular shape that diminishes in width towards the ABS (160) of the slider. The centerline of the plasmon generator (770) is vertical. A small peg (750) is placed between the truncated terminal end of the plasmon generator for purposes of concentrating the plasmon near-field at the recording surface.

Referring to FIG. 6(b), it can be seen that the plasmon generator (700) is separated from the waveguide (500) by a region of cladding (800), that surrounds the waveguide on all sides. It can also be seen that the plasmon generator abuts the pole tip (900) of the write pole which is a part of the write element that has been shown as (31) in FIG. 1 (b).

Figure 7:
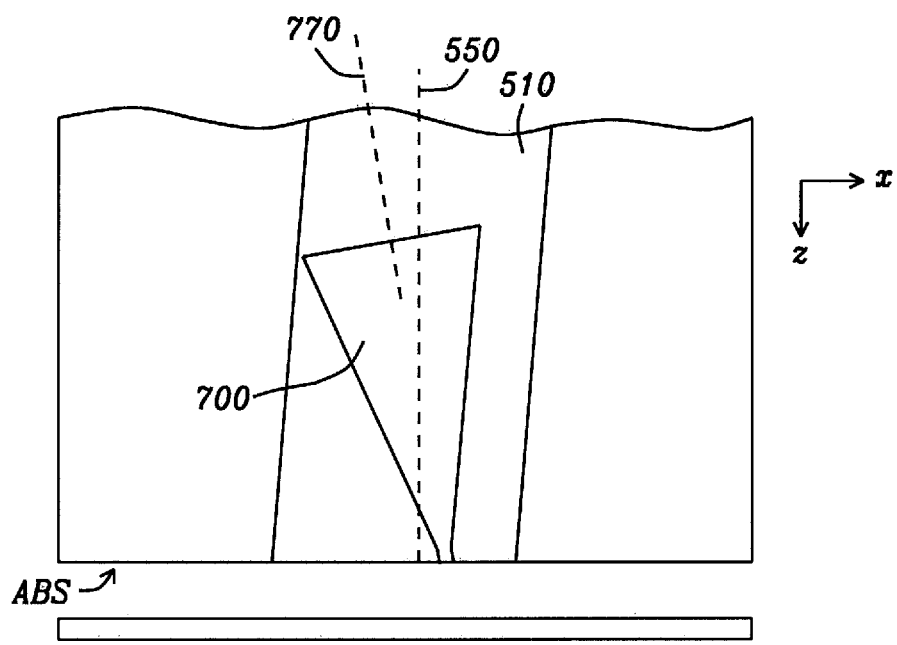
FIG. 7 is a schematic illustration showing a waveguide and adjacent plasmon generator, where both the waveguide and the plasmon generator are tilted.

Referring next to FIG. 7, there is shown a front schematic view of a tilted centerline (550) of a waveguide (510) and an adjacent plasmon generator (700) that is also tilted relative to the waveguide as shown by its centerline (770).

Figure 8:
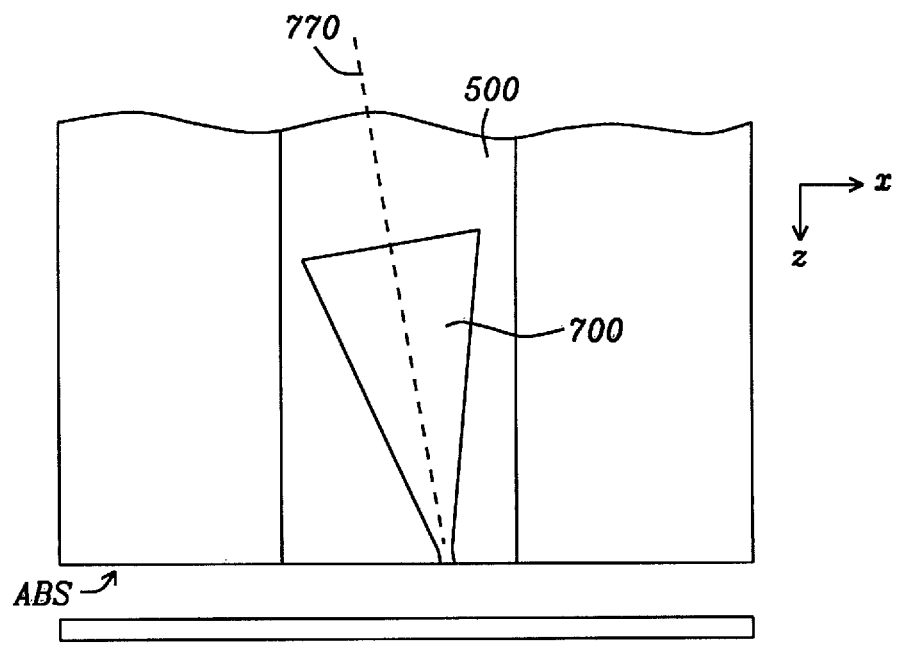
FIG. 8 is a schematic illustration showing a waveguide and adjacent plasmon generator, where the waveguide is not tilted but the plasmon generator is tilted.

Referring next to FIG. 8, there is shown a front schematic view of a straight waveguide (500) with an adjacent tilted plasmon generator (700), as shown by its tilted centerline (770).

Figure 9A:
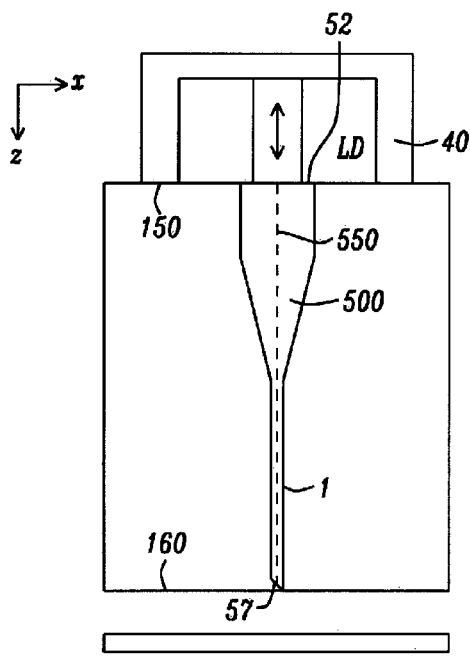
FIGS. 9(a) and (b) are schematic illustrations (full view (a) and detail (b)) showing an alternative version of a straight waveguide with a tilted ABS end surface.
Figure 9B:
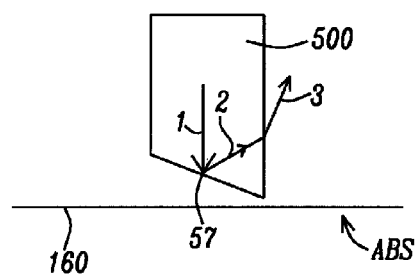

Referring now to FIG. 9 (a), there is shown schematically another approach to eliminate back reflections into a laser diode cavity. In this approach, the ABS end surface (57) of the waveguide (see detail in FIG. 9 (b)) is tilted relative to the ABS surface (160) of the slider, but at the back end surface (152) of the slider, the surface (52) of the waveguide is not tilted. Since the centerline (550) of the waveguide is perpendicular to the ABS of the slider, the light ray, 1, of the downward propagating laser light within the waveguide reflects off the tilted end surface of the waveguide as light ray 2 and is thereafter refracted out of the waveguide as indicated by the arrows representing light ray 3 in FIG. 9 (b). Light ray 3 will be unable to reflect backwards into the laser diode cavity as long as the tilt angle of surface (57) is sufficient.

Figure 10A:
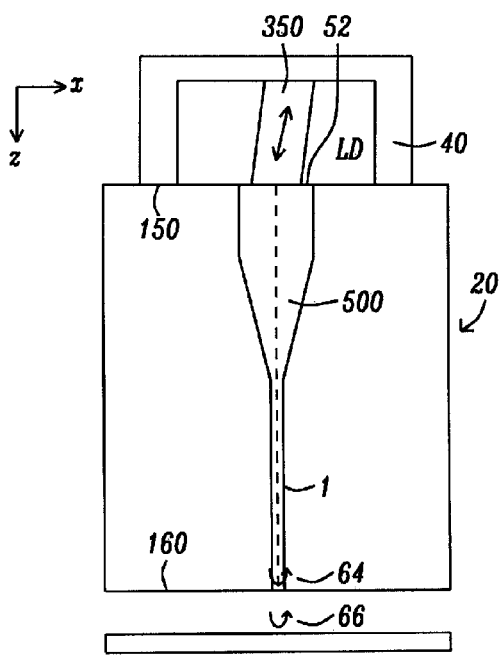
FIGS. 10(a) and (b) are a front and side schematic illustration showing a straight waveguide and a laser diode cavity that is tilted in the x-z plane and used to reduce back reflection into the cavity.
Figure 10B:
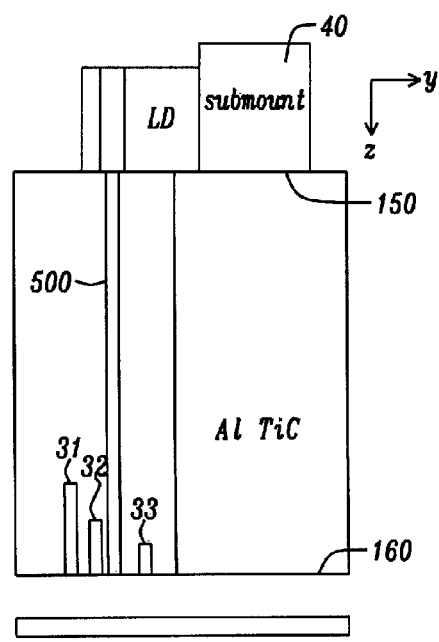

Referring next to FIGS. 10 (a) and (b), there are shown schematically a front (a) and side (b) cross-sectional view of a straight waveguide (500) that is abutted to a laser diode having a tilted cavity (35) in the x-z plane. With this configuration, the emitted laser radiation will enter the waveguide at (52) and, by refraction, propagate towards the ABS end (160), but reflected waves from interface 2 (curved arrow (64)), that is between the ABS end of the waveguide and the air layer, and interface 3 (curved arrow (66)), that is between the air layer and the recording medium, will be unable to couple with the reflection at the entrance interface 1 and reflect backwards into the laser cavity (35), which is effectively a tilted waveguide structure itself. The tilted conformation of the laser diode can be achieved within the patterning step of a laser diode wafer, in which step the waveguide and laser tilted configuration are defined. Note that the base of the laser diode, as shown in FIGS. 10(a) and 10 (b) sits flat on the backside (150) of the slider.

Referring to schematic FIGS. 11 (a) and (b) there are shown front and side illustrations of an embodiment in which the laser cavity (37) is tilted in the y-z plane, but the waveguide (500) is not tilted. The laser diode is mounted on a submount whose face is also tilted. The tilt of the laser diode can be achieved by cleaving the laser diode chip. Because of the angle with which light from the laser enters the top surface (52) of the waveguide, even though the waveguide surface is not itself tilted, the internally reflected light within the waveguide will be unable to couple in a manner that produces a significant amount of backward reflected light into the laser cavity.

It is noted that the laser cavity is essentially a Fabry-Perot resonator of proper crystal plane separation to support the lasing process. Thus, once the properly separated opposite planar crystal surfaces of the crystallographic structural planes of the laser diode wafer are determined on the wafer, the planes are cleaved and the laser cavity is thereby determined. Then, if a tilted laser cavity is desired, the lateral sides of the cavity can be cleaved along chosen tilt angles and the resultant tilted cavity can be bonded to the submount. The submount itself may be formed of silicon or the like and its bonding surfaces may be formed by machining or tilt-lapping. Of course, it is required that the cavity be bonded to the submount and thereafter to the waveguide in a manner that preserves the required tilt angle.

Referring, finally, to FIGS. 12 (a) and 12 (b) there are shown schematic front and side views of an untilted waveguide (500) for the purposes of indicating approximate dimensions (all dimensions are shown in μm). The waveguide shape can be schematically broken into three continuous sections, a first section, A, of constant maximum width and of length between approximately 0 (i.e the section is not present) and 50 microns; a second section, B, of tapering width and length between approximately 30 and 100 microns, and a third section, C, of constant narrowest width between approximately 0.5 and 0.8 microns and length between approximately 5 and 100 microns. The side view, FIG. 12 (b) shows that the thickness of the waveguide is approximately constant and between approximately 0.3 and 0.5 microns.

The core of the waveguide can be formed of low-loss and high refractive index dielectrics, such as $Ta_2O_5$ or HfOx. Cladding surrounding the waveguide (such cladding is understood in all previous figures) can be made of low-loss, low refractive index dielectrics, such as $Al_2O_3$, $SiO_2$, SiON and TaSiOx.

As is understood by a person skilled in the art, the preferred embodiments of the present disclosure are illustrative of the present disclosure rather than being limiting of the present disclosure. Revisions and modifications may be made to methods, processes, materials, structures, and dimensions through which is formed a TAMR write head with an optical architecture that transfers radiation from an optical frequency laser diode, through a waveguide and plasmon generator, to a recording medium, wherein elements of the optical structure are tilted at various positions to eliminate radiation reflection back into the laser, while still providing such a TAMR write head and its optical structure, formed in accord with the present disclosure as defined by the appended claims.

What is claimed is:

1. A TAMR (thermally assisted magnetic recording) head slider, comprising:

a slider substrate having a horizontal planar back end surface and a horizontal planar ABS (air bearing surface);

a magnetic write element, emerging at said ABS which produces a magnetic field for writing on a magnetic recording medium rotating beneath said horizontal planar ABS end;

a waveguide extending through said slider from said slider back end surface to said slider ABS end, wherein said waveguide has a dielectric core and is surrounded by a dielectric cladding, wherein said waveguide propagates optical frequency electromagnetic radiation along a centerline direction towards said slider ABS end, wherein said waveguide has a planar back end surface that is coplanar with said slider back end surface, at which back end surface said optical frequency electromagnetic radiation couples with said waveguide and;

wherein said waveguide has a planar ABS end, and wherein said planar ABS end lies within said slider ABS or is tilted relative to said slider ABS end; and wherein a laser diode source of optical frequency electromagnetic radiation is affixed to said planar back end surface of said slider;

wherein an exit facet of said laser diode source is electromagnetically coupled to said waveguide at said planar backside end of said waveguide; wherein said laser diode includes a linear resonant cavity having a central axis of symmetry, wherein said central axis of symmetry of said linear resonant cavity is aligned at an angle to a normal to said backside end of said waveguide; and wherein a plasmon generator is formed between said write element and said waveguide;

wherein said plasmon generator has a central axis of symmetry and is positioned adjacent to said waveguide at said ABS end of said waveguide and separated from said waveguide;

wherein said electromagnetic radiation is coupled to a plasmon mode in said plasmon generator; wherein said centerline direction of said waveguide at said backend surface of said waveguide is tilted relative to said central axis of symmetry of said laser diode cavity or is not tilted relative thereto; wherein said centerline direction of said waveguide is tilted relative to either said planar backside surface or said planar ABS or both said surfaces, whereby;

reflections of said electromagnetic radiation, originating at interfacial surfaces and at regions of radiative coupling and proceeding in a direction back towards said laser diode are suppressed by failing to satisfy critical angle criteria set by dielectric constants of said core dielectric material and dielectric cladding material and wherein cavity modes of said laser are thereby stable.

2. The TAMR head slider of claim 1 wherein said resonant cavity from which said laser radiation is emitted has an axis of symmetry that is tilted in a x-z plane at an angle to a normal to said backside end of said waveguide.

3. The TAMR head of claim 1 wherein said axis of symmetry of said resonant cavity of said laser diode is tilted in a y-z plane but is not tilted in an x-z plane and wherein said laser diode is affixed to a submount having a planar bottom surface and a tilted front face to support said laser diode and wherein said submount planar bottom surface is affixed to said backside surface of said slider.

4. The TAMR head of claim 1 wherein said laser diode comprises a cavity that is a Fabry-Perot resonant cavity formed by parallel crystallographic planes cleaved from a laser diode wafer.

5. The TAMR head of claim 4 wherein said laser diode is tilted by scribing and tilting cleavage planes forming lateral sides of said cavity.

6. The TAMR head of claim 3 wherein said submount is a silicon submount whose mounting surfaces are tilted relative to a vertical direction machining or tilt-lapping.

7. A method of forming a TAMR (thermally assisted magnetic recording) head slider, comprising:

providing a slider substrate having a horizontal planar backside end surface and a horizontal planar ABS (air bearing surface) end and including a read/write element embedded in said ABS;

forming a waveguide in said slider substrate, said waveguide extending through said slider from said slider backside end surface to said slider ABS end, wherein said waveguide has a dielectric core and is surrounded by a dielectric cladding, wherein said waveguide propagates optical electromagnetic radiation along a centerline direction towards said slider ABS end, wherein said waveguide has a planar backside end at which backside end electromagnetic radiation enters said waveguide and wherein said waveguide has a planar ABS end and wherein said planar ABS end lies within said slider ABS or is tilted relative to said slider ABS;

forming a laser diode source of said electromagnetic radiation and affixing said laser diode source to said planar back end surface of said slider, wherein said laser diode includes a cavity resonator having a central axis of symmetry and wherein an exit facet of said laser diode source is tilted relative to said central axis of symmetry of said resonant cavity and abuts said planar backside end of said waveguide and is thereby optically coupled to said waveguide;

forming a plasmon generator between said write element and said waveguide wherein said plasmon generator has a central axis of symmetry and wherein said plasmon generator is adjacent to said waveguide at said ABS end of said waveguide, whereat said electromagnetic radiation in said waveguide is coupled to a plasmon mode within said plasmon generator; wherein said centerline direction of said waveguide is tilted relative to either said planar backside surface or said planar ABS or both said surfaces, whereby;

reflections of said electromagnetic radiation in a direction back towards said laser diode are suppressed and wherein cavity modes of said laser are thereby stable.

* * * * *